Figure 4:
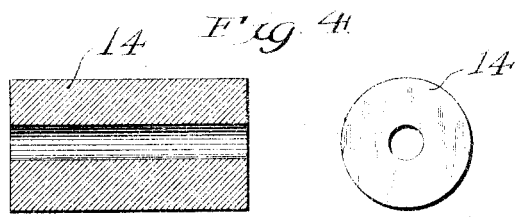

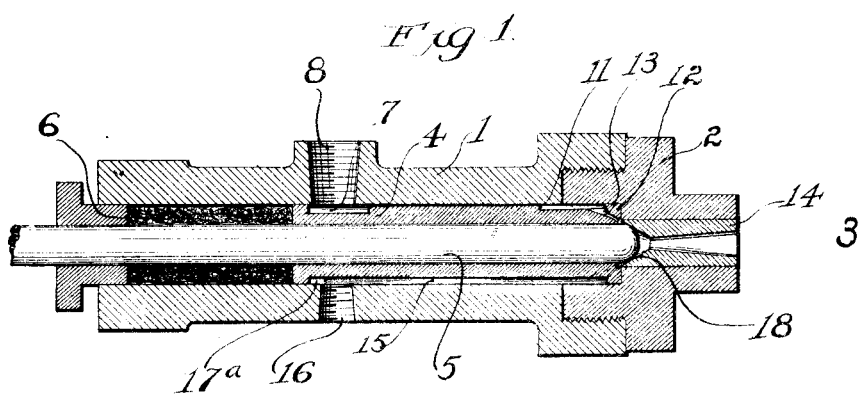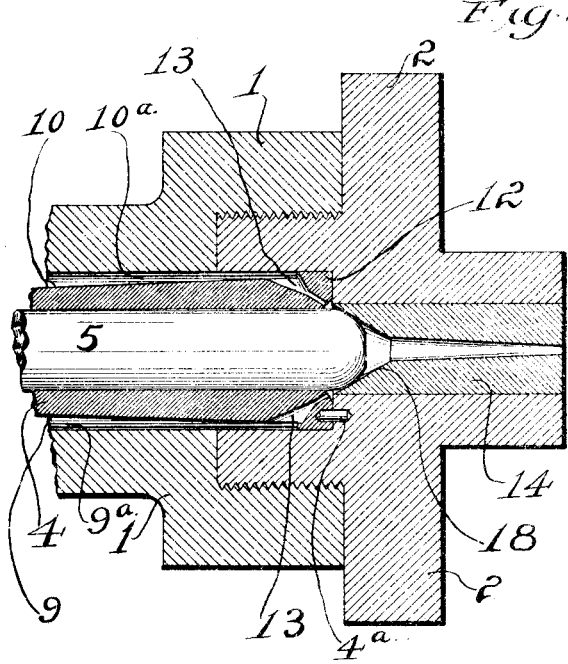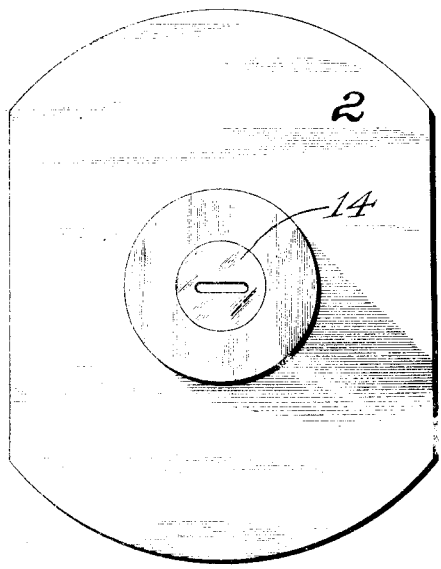

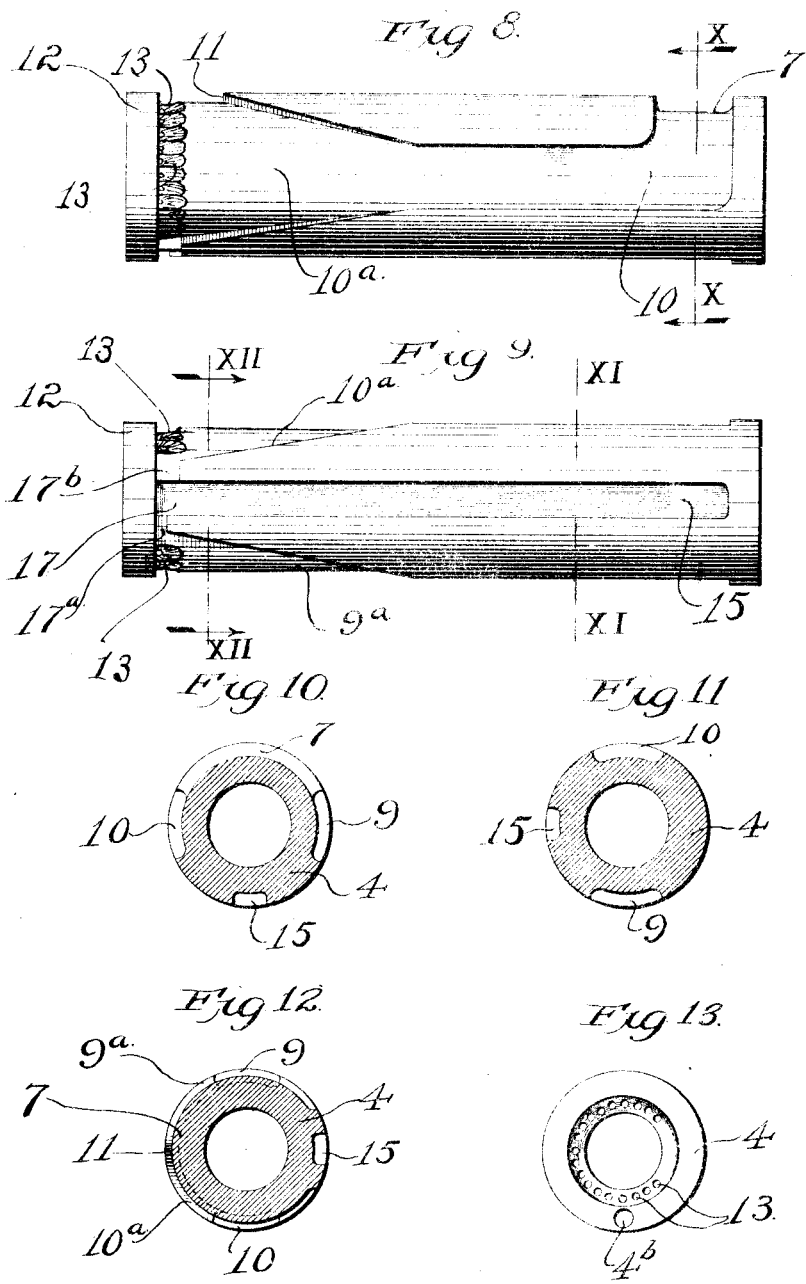

UNITED STATES PATENT OFFICE.

HERBERT R. KOHLER, OF ST. LOUIS, MISSOURI, ASSIGNOR TO BUSCH-SULZER BROS.-DIESEL ENGINE COMPANY, OF ST. LOUIS, MISSOURI, A CORPORATION OF MISSOURI.

FUEL-INJECTOR FOR OIL-ENGINES.

1,184,355.

Specification of Letters Patent.   Patented May 23, 1916.

Application filed September 18, 1913. Serial No. 790,407.

*To all whom it may concern:*

Be it known that I, HERBERT R. KOHLER, a citizen of the United States, residing at St. Louis, in the State of Missouri, have invented the following-described Improvements in Fuel-Injectors for Oil-Engines.

The invention is an improved fuel injection device for oil engines, and more particularly for engines operating on the Diesel cycle, although it is applicable to any type of apparatus in which liquid fuel is atomized and injected under heavy pressure.

The features of improvement reside in the structure and assemblage of the parts, all of which are extremely simple and capable of production at low cost with a high degree of accuracy, and also in the mode of operation, which gives a material improvement in the combustion of the oil, while permitting less difference between the injection and compression pressures.

The drawings forming a part hereof illustrate so much of the preferred embodiment of the invention as will be necessary to inform those skilled in the art fully as to the structure and mode of operation thereof.

Figure 1 is a central longitudinal section of so much of a fuel injector as will be necessary to illustrate the invention, the section being in the plane of the nozzle orifice. Fig. 2 is a similar view on larger scale, taken on a plane transverse to the plane of the nozzle orifice. Fig. 3 is an end view of Fig. 2. Figs. 4, 5, 6 and 7, are sections and end views of the nozzle proper in its successive stages of manufacture, as later explained. Figs. 8 and 9 are a side view and bottom plan, respectively, of the atomizer sleeve. Fig. 10 is a cross-section thereof on line X—X of Fig. 8; Fig. 11 a cross-section thereof on line XI—XI of Fig. 9; Fig. 12 a cross-section on line XII—XII of Fig. 9; and Fig. 13 is an end view of the completed sleeve.

The valve chamber of the injector is provided by a casing or bushing 1 and an extension part 2 which may be screwed thereon as indicated. The exterior conformation of these parts adapts them to be fitted into a seat on the engine so that the nozzle at the end of the valve chamber will discharge directly into the compression or combustion space of such engine, indicated at 3. Within the valve chamber there is an atomizer sleeve 4, which is fitted snugly against the chamber wall and externally grooved or formed, as described below, to provide channels between such wall and itself for the passage of oil and air to the nozzle 14. The movable valve plug member 5 enters the casing 1 through a gland 6 of ordinary construction and extends through the bore of the atomizer sleeve, which it closely fits, to the valve seat 18 at the end of the chamber. The packing of the gland 6 may bear upon the end of the atomizer sleeve so as to maintain it in place, as indicated, as well as to keep the valve tight against leakage.

Figs. 8 to 13 illustrate the external formation of the atomizer sleeve. The cross channel marked 7, appearing in Figs. 8 and 10, registers with a laterally disposed air inlet connection 8 in the casing 1, when the atomizer sleeve is in place in the latter. It is kept from rotative displacement by a small dowel-pin 4ª at the end of the sleeve. The compressed air entering the cross channel 7 flows equally into two longitudinal channels 9 and 10, formed in the surface of the sleeve on opposite sides thereof. These channels broaden out, laterally or circumferentially, of the sleeve, and embrace substantially the whole circumference of the sleeve when they reach the head flange 12, forming behind this flange an annular space or chamber. The flared portions of the channels 9 and 10 are marked 9ª and 10ª, respectively, and the point where they merge on one side of the sleeve is marked 11, and appears in Figs. 8 and 12. The point where they merge on the opposite side is marked 17. The depth of the side channels 9 and 10, including their broadened terminals, decreases in substantial proportion to their broadening, so as to provide a substantially uniform cross-sectional area for the flow of compressed air from the lateral inlet 8 to the annular space back of the head flange and substantially uniform pressure at all points in such space when the device is in action. From a series of points in this annular space, the sleeve is drilled with a number of jet holes 13, the axes of which converge toward a point within the nozzle 14. These holes are fine and generously counterbored, as shown in the drawings, and their outer orifices open just in the rear of the valve seat of the plug member 5. Between the side channels 9 and 10, the exterior of the atomizer sleeve is cut with a further channel 15, which is adapted to register with a lateral oil inlet connection 16 formed in the side of the casing 1. Oil entering at this point flows along the channel 15 to the point 17, where it may branch or spread through the openings 17ᵃ and 17ᵇ into the annular space behind the head flange 12, above referred to, and thence pass commingled and atomized with the air through the convergent jet holes 13 whenever the valve plug is removed from its seat 18. The said seat is formed directly in the nozzle member 14, by enlarging and coning the bore at the base of the nozzle, as indicated in the drawings, and so that the smaller end of the coned portion merges directly into the bore of the nozzle proper. This bore is long and tapered and its internal shape is such that its cross-sectional area diminishes gradually toward its orifice, and its sectional contour changes, also gradually, from substantially a circle at its end nearest the valve seat, to a flattened ellipse or oblong slit at its discharge end, the said discharge slit being considerably longer than the diameter of the circular portion of the nozzle bore, as shown in Fig. 1, and very much smaller in width than such diameter, as shown in Fig. 2. By such formation of the nozzle bore the atomized mixture of oil and air moves from the valve seat with an increasing velocity, due to the decreasing cross-sectional area of the bore, and at the same time gradually changes its shape so as eventually to assume the form of a thin, flat, spreading blast when it enters the body of compressed, hot air in the combustion space 3. Either from this shape or the increased velocity, or by both, or by the elimination of possible stratification that may exist in cylindrical or conical jets, or by reason of all these conditions, the practical operation of the valve mechanism above described gives a marked improvement in efficiency, as has already been indicated.

Figure 5:
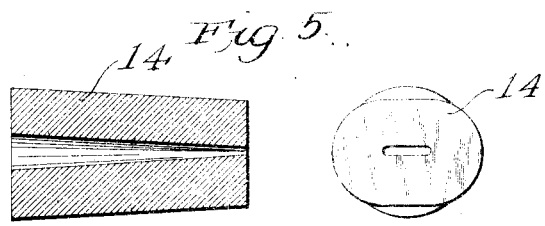
Figure 6:
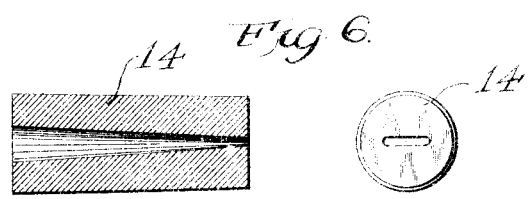
Figure 7:
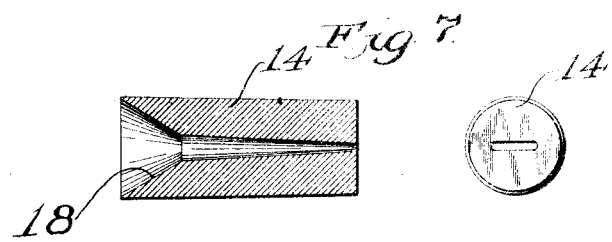

For convenience in manufacturing this otherwise difficult shape or nozzle bore, I have devised a method of making the same with few operations of simple character, and this method of manufacture also constitutes a part of the present invention. I first take a piece of stock, as indicated in Fig. 4, and drill and ream an axial hole through it of a predetermined diameter. I next flatten one end of this piece, as indicated in Fig. 5, until the circular orifice becomes thin and flat, as indicated in the end view of Fig. 5, taking pains that the interior convergence of the bore shall be as uniform as possible. I next turn the exterior of the piece to cylindrical or conical form, as may be desired, in order to assemble it with the extension part 2 of the valve casing, and as indicated for example in Fig. 6. Finally I finish the nozzle by reaming the outlet orifice to a desired and uniform dimension and then counterboring the conical seat 18 for the valve plug. The piece can then be set or fastened in place in the part 2, so as to form a substantially integral part thereof. As referred to one plane, that of the section of Fig. 1 for instance, the bore of the nozzle tapers or inclines divergently from the valve seat to its discharge slit, the latter being longer than the largest diameter of the circular portion of the bore; and as referred to another plane which is perpendicular to that of Fig. 1, for instance that of the section of Fig. 2, the bore tapers convergently toward the discharge slit, being thus both convergent and divergent, respectively, in two planes.

By opening the gland 6, the atomizer sleeve may be withdrawn from its casing, and when so removed will at once expose all of the air and oil channels in the injector for cleaning, there being no parts requiring to be separated or unscrewed for this purpose. The jet holes 13 by reason of their short length and wide counterboring are easily cleansed of any accumulated solid matter, while the nozzle itself and the valve seat can be readily wiped from the open end of the casing without removal of the injector from the engine.

I claim:

1. A fuel injector for oil engines comprising a valve casing provided with a nozzle, an atomizer sleeve fitting the interior of such casing and externally formed with separate air and oil channels leading toward the nozzle, a series of oblique jet-holes in such sleeve convergent at a point within the nozzle, said channels bringing the oil and air together at a point adjacent the jet holes and before passing through the same, and a valve plug member controlling the passage of oil and air from the jet holes through the nozzle.

2. A fuel injector for oil engines, comprising a valve casing provided with a long nozzle and lateral inlets for oil and air, an atomizer sleeve fitting the interior of such casing and externally formed with separate oil and air channels registering respectively with said lateral inlets and with jet-holes leading to the nozzle, said channels bringing the oil and air together at a point adjacent the jet holes and before passing through the same, and a valve plug member within the sleeve and casing controlling the passage of the mixture from the jet holes through the nozzle.

3. A fuel injector for oil engines comprising a valve casing provided with a nozzle and a valve seat formed in one piece with said nozzle, an atomizer sleeve fitting the interior of the said casing and externally formed with separate air and oil channels, a series of jet holes in such sleeve, in rear of the valve seat, convergent from said channels toward the nozzle, said channels bringing the oil and air together at a point adjacent the jet holes and before passing through the same, a valve plug member extending through the sleeve into engagement with the valve seat.

4. A fuel injector for oil engines, comprising a valve casing provided with a long nozzle of diminishing cross-sectional area, an atomizer sleeve fitting the interior of such casing and externally formed with oil and air channels and with convergent jet-holes leading toward the nozzle and a valve plug member operating through the sleeve upon a valve seat at the base of the nozzle.

5. A fuel injector for oil engines, comprising a valve casing provided with a nozzle, an atomizer sleeve fitting the interior of such casing and externally formed with separate air and oil channels leading toward the nozzle, a series of counter-bored, short jet-holes drilled in such sleeve convergent at a point within the nozzle, and a valve-plug member working through the sleeve upon a valve seat at the base of said nozzle.

6. A fuel injector for oil engines comprising a valve casing, an atomizing means therein including a series of convergent jet holes, a long nozzle in which the axes of such holes converge, such nozzle having a diminishing cross-sectional area from the jet-holes to its discharge orifice, a valve seat formed at the base of such nozzle and a valve plug member coacting therewith.

7. A fuel injector for oil engines, comprising a valve casing, an elongated nozzle at the end of said casing having a passage which diminishes in sectional area toward its discharge orifice and has a sectional contour changing from a substantial circle to an oblong slot or slit at its said orifice, a valve seat in rear of said passage, an atomizer sleeve fitting the interior of the casing and formed externally with both oil and air channels, said channels being in communication, convergent jet holes leading from said channels and opening in rear of the valve seat, and a valve plug member extending through the sleeve to engage with said seat.

8. A fuel injector for oil engines comprising a valve casing, a valve plug and a valve seat and a discharge nozzle, the bore of such nozzle being formed with long convergent and divergent tapers, in different planes, extending from adjacent the valve seat to its discharge orifice.

In testimony whereof I have signed this specification in the presence of two witnesses.

HERBERT R. KOHLER.

Witnesses:
 FRANK P. BOYD,
 H. FREIDRICHS.